Dec. 16, 1958 V. P. DANFORD 2,864,928
ELECTRICALLY CONDUCTIVE OPTICAL ARTICLE
Filed Jan. 18, 1957

INVENTOR.
VANCE P. DANFORD
BY Lyon & Lyon
ATTORNEYS

United States Patent Office 2,864,928
Patented Dec. 16, 1958

2,864,928

ELECTRICALLY CONDUCTIVE OPTICAL ARTICLE

Vance P. Danford, Burbank, Calif., assignor to The Sierracin Corporation, Burbank, Calif., a corporation of California Application January 18, 1957, Serial No. 635,048

4 Claims. (Cl. 219—19)

This invention relates to electrically conductive optical articles of the type having a coating consisting of a thin, transparent film of metal thereon as the electrically conductive portion thereof.

Lenses employed in goggles and in face shields used in cold or freezing weather have always been subject to clouding up due to condensation and freezing of the breath upon the same, thus destroying the initial transparency of the lens. In airplanes and other fast-moving vehicles such as trains which move through cold strata of air, there exists a very serious problem of condensation of moisture and, under severe conditions, actual ice formation upon the windows and windshields of the vehicle. In the case of airplanes, the icing of the windows has presented an especially serious problem. Accordingly, glazing members of glass or transparent plastic and having thereon an extremely thin and transparent, yet electrically conductive, coating of a metal are presently being produced to overcome these problems, the coating permitting the direct generation of heat in contact with the glass or plastic at all points over the surfaces thereof.

Current practice in the aircraft industry requires the initial production of the coated articles in large sheet or blank form, which sheets are sold to fabricators who in turn fabricate the large sheets into smaller articles such as aircraft windshields and the like. The initial coated articles in sheet form must include electrical contact or connection means for electrically connecting the finished glazing product to the electrical system of the aircraft or other vehicle or assembly in which the finished product is installed. One of the principal objects of this invention is, therefore, to provide novel electrical contact means in such coated optical articles.

More specifically, it is an object of this invention to provide metal coated optical sheet material including novel electrical contact means which are flexible from the standpoint that the electrical integrity thereof may be maintained even through the sheet material is trimmed to finished optical articles of varying dimensions.

The fabrication of the metal coated optical material often includes, in addition to trimming to size and addition of accessories such as edge attachment devices, the forming of the sheet material into curved contours of various configurations. Another object of this invention is to provide electrical contact means in metal coated optical sheet material, which means maintain their electrical and mechanical integrity even when subjected to the stresses and strains of the forming operations.

Other objects and advantages of this invention, it is believed, will be readily apparent from the following detailed description of preferred embodiments thereof when read in connection with the accompanying drawings.

Figure 1:
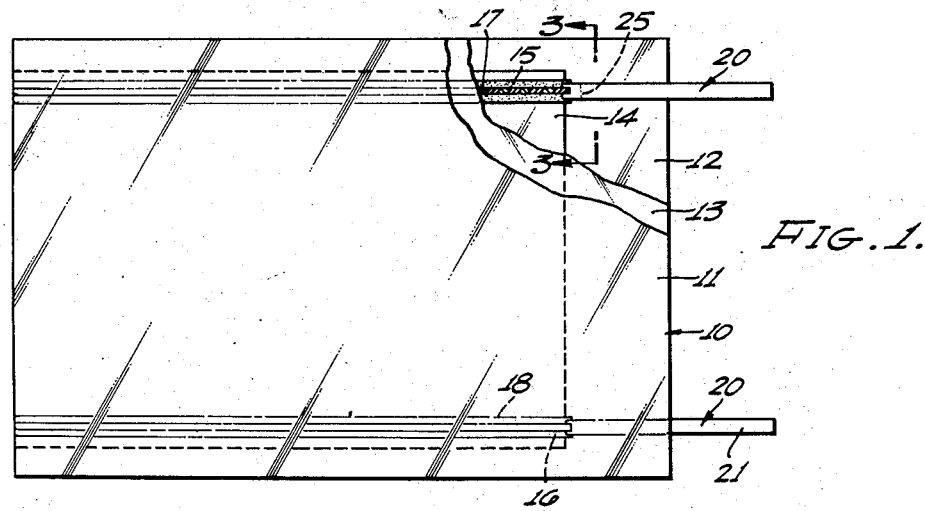
Figure 1 is a top plan view of a metal coated sheet of optical material made in accordance with the invention.

Referring now to the drawings, the large sheet or blank of coated optical material is generally indicated 10. While the sheet may take many various forms, as will be known to those skilled in the art, for the purpose of illustrating the invention, the sheet 10 is a laminate consisting of a base or load-bearing sheet 11 of optical resinous plastic material such as a polyester resin, a face shield 12 of the same material, and an interlayer 13 of a flexible plastic material such as vinyl butyrate. Prior to forming the laminate, a thin, transparent metal coating is applied to the inner side of the face shield 12 in a manner familiar to those skilled in the art. In contact with the metal coating at the top and bottom thereof is a pair of bus bars 15 and 16, a pair of thin braided wire conductors 17 and 18 being located centrally of and in contact with the bus bars. The bus bars are preferably of silver, silk screened onto either face shield 12 or the metal coating 14. In place of the bus bars and wires, any type low resistance conductors may be used.

From the description thus far it will be understood to those skilled in the art that when an electric circuit is applied to the conductors 17 and 18, the current will flow therethrough, through the bus bars and thence uniformly across the metal coating 14, the resistance thereof causing it to become heated. However, inasmuch as the device thus far described is in the form of a blank to be later trimmed to size, means are provided for making electrical contact between the conductor wires and the electrical system of the device in which the finished coated article is to be installed.

As shown in the drawings, these means may include a pair of sets 20 of contact elements, each set comprising a pair of elements or socket members 21 and 22 and an intermediate element or plug member 23 sandwiched between the socket members. These contact elements are preferably of extremely thin brass and of generally rectangular, elongated shape. The socket members 21 and 22 are preferably soldered together at the inner ends thereof and soldered to the end of each of the wire conductors 17 and 18. The inner ends 25 of the plug members 23 terminate short of the soldered ends of the socket members 21 and 22.

Figures 3, 6:
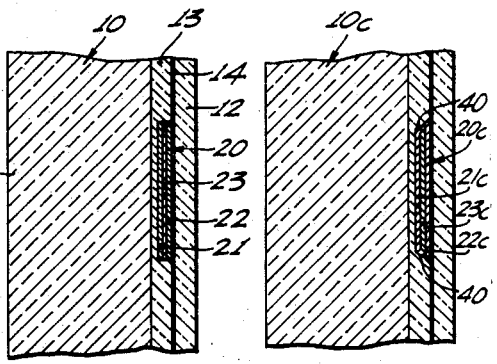
Figure 3 is a sectional view taken substantially on the line 3—3 of Figure 1.
Figure 6 is a sectional view similar to Figure 3 but illustrating a further modified form of the invention.

As shown in Figure 3, in this embodiment of the invention, the sets 20 are embedded in the vinyl interlayer 13, and they extend out from the end of the blank 10. In use of the blank, the fabricator must trim it to size and perform other operations thereon prior to installation in the aircraft or other assembly. Before doing so he removes each of the plug members 23, which is easily done merely by pulling them outwardly from their sandwiched position, inasmuch as they are maintained in these sandwiched positions only by the frictional contact with the socket members 21 and 22. The resilience of the vinyl interlayer 13 is such as to exert a clamping action by the members 21 and 22 upon the plug members 23 and, while this is sufficient to maintain the plug members in position during normal handling and use of the articles, the plug members may be readily pulled out and completely disengaged from the socket members.

Figure 2:
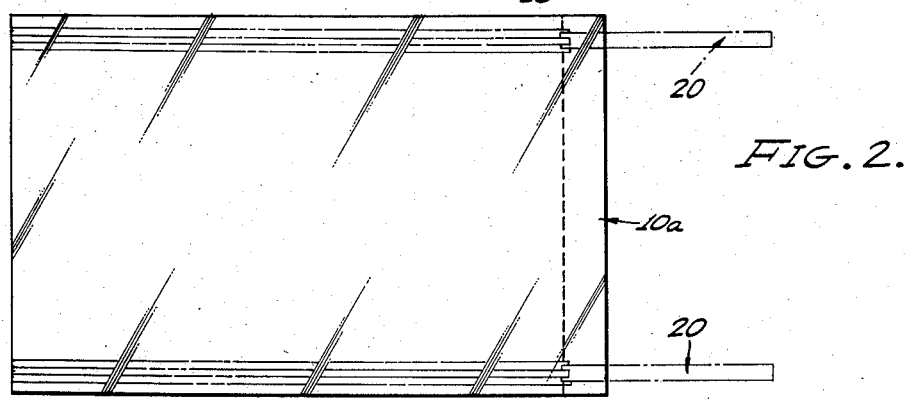
Figure 2 is a top plan view thereof after it has been trimmed to size for use.
Figure 4:
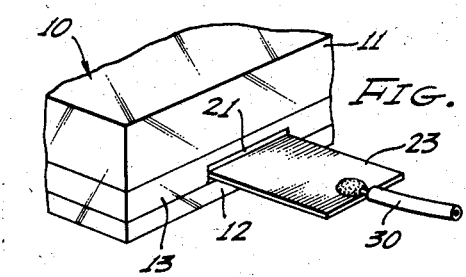
Figure 4 is a fragmentary perspective view illustrating the installation of the electrical contact means.

After the plug members have been disengaged as described, the blank 10 is then trimmed to the desired size to provide the article 10a shown in Figure 2. In this trimming operation, both pairs of socket members are also trimmed, the outer portions which are thus removed (phantom lines of Figure 2) being discarded. Either before or after mechanical installation of the trimmed sheet 10a in the aircraft or other assembly, the plug members 23 are trimmed to the desired length, if necessary, and the plugs are then reinserted between the respective socket members 21 and 22. Here again the resilience of the vinyl interlayer is beneficial since it permits the socket members to be sprung apart sufficiently to allow introduction therebetween of the very thin plug members. As shown in Figure 4, the conductor wires 30 of the aircraft electrical system are soldered to the plug members, completing the installation.

If the article 10a is to be permanently installed, it may be desirable to provide means for permanent connections between the socket members and plug members. In such event, the inner side of one or both of the socket members of each pair may be tinned prior to assembly into the blank 10, and one or both sides of each of the plug members may be similarly tinned. Then, after final fabrication and assembly by the fabricator, heat may be applied to the plug members to solder them to the socket members.

Figure 5:
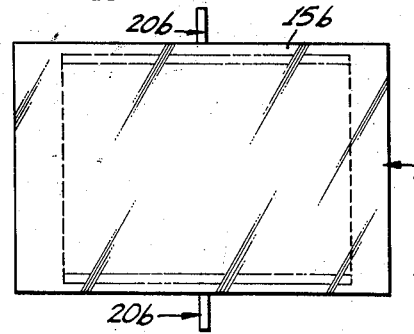
Figure 5 is a top plan view illustrating a modified form of the invention.

The positions at which the contact element sets 20 are connected to the wires 17 and 18 and/or bus bars 15 and 16 is not critical. Thus, in the embodiment shown in Figure 5, the contact element sets 20b extend into the sides of the blank 10b and contact the central portion of the bus bars 15b and 16b.

A further modified form of the invention is illustrated in Figure 6, embodied in a blank 10c. The assembly is generally similar to that described above in connection with the blank 10, except that here the sets 20c of contact elements include one socket member 21c having down-turned marginal edges 40. The other socket member 22c and the plug member 23c are similar to those described above. With this arrangement, any possible lateral displacement of the plug members with respect to the socket members is prevented.

From the above description it will be understood that the present invention provides electrically conductive coated optical articles having novel means for establishing electrical contact with an energizing circuit. The contact means are flexible from the standpoint that they do not interfere in any manner with the subsequent final fabrication of the articles. Moreover, they are so designed as to maintain their mechanical and electrical integrity when subject to the tension and compression stresses set up during forming of the articles into curved configurations. The construction of the contact elements is such as to permit sliding of one element over the other without damage during forming or during other distortion or twisting of the articles such as may be caused by pressurization and/or by violent maneuvers of the aircraft.

Having fully described my invention, it is to be understood that I do not wish to be limited to the details set forth, but my invention is of the full scope of the appended claims.

I claim:

1. In an electrically conductive optical article, the combination of a laminate comprising a pair of transparent bodies, and an interlayer of a transparent resilient material interposed between said bodies, one of said bodies having a transparent electrically conductive coating on the inner surface thereof; and electrical contact means for said coating, said means comprising a pair of sets of electrical contact elements, each set including a socket member embedded in said interlayer in electrical contact with said coating, and a plug member releasably engageable with each of said socket members, said socket members extending at least to one exterior portion of said laminate, one end of each of said plug members extending outwardly from said laminate, the resiliency of said interlayer material being sufficient to maintain said plug members in engaged relation with said socket members, but permitting withdrawal of said plug members upon the imposition of relative sliding forces between said plug members and said socket members.

2. In an electrically conductive optical article, the combination of a laminate comprising a pair of transparent bodies, and an interlayer of a transparent resilient material interposed between said bodies, one of said bodies having a transparent electrically conductive coating on the inner surface thereof; and electrical contact means for said coating, said means comprising a pair of sets of electrical contact elements, each set including a pair of thin, elongated socket members superposed one upon the other and embedded in said interlayer in electrical contact with said coating, and a thin, elongated plug member inserted between and parallel to each pair of said socket members, said socket members extending at least to one exterior portion of said laminate, one end of each of said plug members extending outwardly from said laminate.

3. In an electrically conductive optical article, the combination of a laminate comprising a pair of transparent bodies, and an interlayer of a transparent resilient material interposed between said bodies, one of said bodies having a transparent electrically conductive coating on the inner surface thereof; and electrical contact means for said coating, said means comprising a pair of sets of electrical contact elements, each set including a pair of thin, elongated socket members superposed one upon the other and embedded in said interlayer in electrical contact with said coating, and a thin, elongated plug member inserted between and parallel to each pair of said socket members, said socket members extending at least to one exterior portion of said laminate, one end of each of said plug members extending outwardly from said laminate, the resiliency of said interlayer material being sufficient to maintain said plug members in engaged relation with said socket members, but permitting withdrawal of said plug members upon the imposition of relative sliding forces between said plug members and said socket members.

4. In an electrically conductive optical article, the combination of a laminate comprising a pair of transparent bodies, and an interlayer of a transparent resilient material interposed between said bodies, one of said bodies having a transparent electrically conductive coating on the inner surface thereof; and electrical contact means for said coating, said means comprising a pair of sets of electrical contact elements, each set including a pair of thin, elongated socket members superposed one upon the other, and a thin, elongated plug member inserted between each pair of said socket members, said socket members extending at least to one exterior portion of said laminate, one end of each of said plug members extending outwardly from said laminate, the marginal edges of one of said socket members of each pair being turned in to prevent lateral movement of said plug members relative to said socket members.

References Cited in the file of this patent

UNITED STATES PATENTS

| | | |
|---|---|---|
| 2,097,073 | Long | Oct. 26, 1937 |
| 2,254,280 | Gottheimer | Sept. 2, 1941 |
| 2,267,610 | Jone | Dec. 23, 1941 |
| 2,490,433 | Gunning et al. | Dec. 6, 1949 |
| 2,507,036 | McCrumm et al. | May 9, 1950 |
| 2,552,955 | Gaiser et al. | May 15, 1951 |
| 2,644,066 | Glynn | June 30, 1953 |